April 29, 1958   G. F. W. POWELL   2,832,352
MACHINES FOR MANIPULATING CUT TOBACCO
Filed Aug. 11, 1952   8 Sheets-Sheet 1
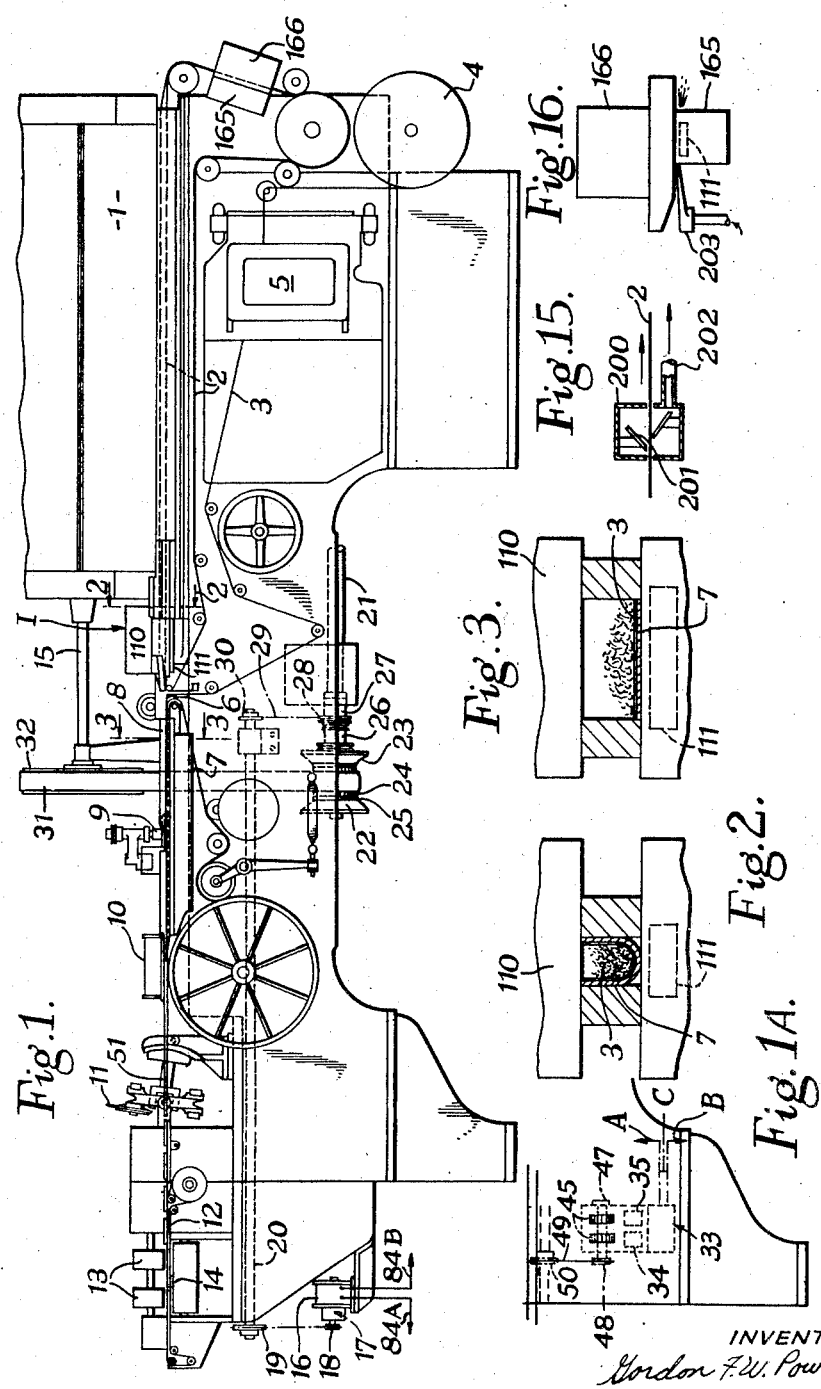
INVENTOR
Gordon F. W. Powell
BY Watson, Cole,
Grindle & Watson
ATTORNEYS

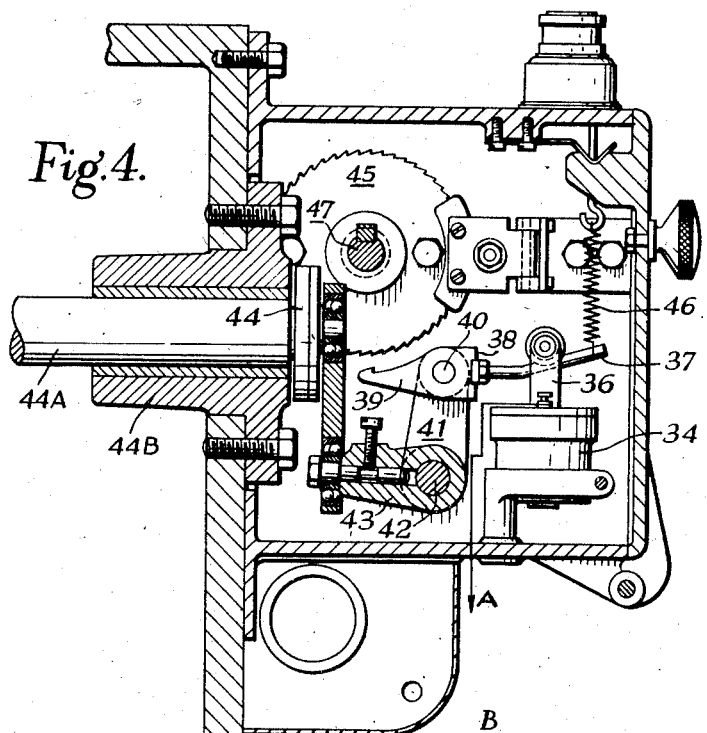
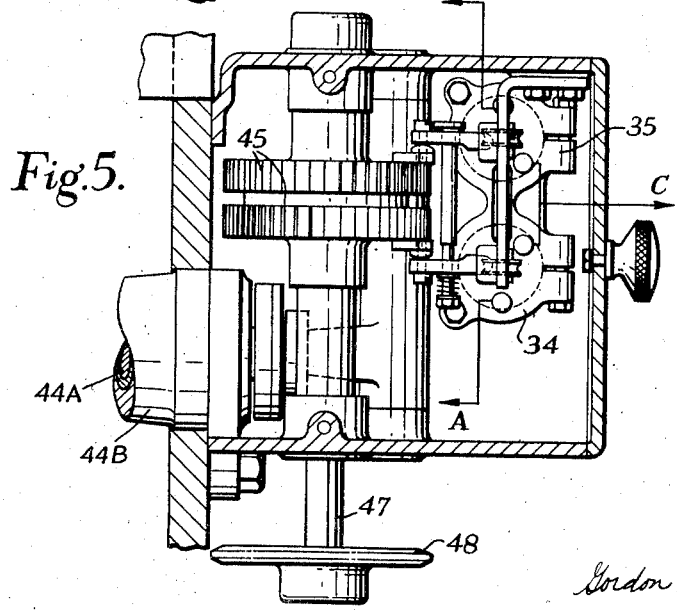

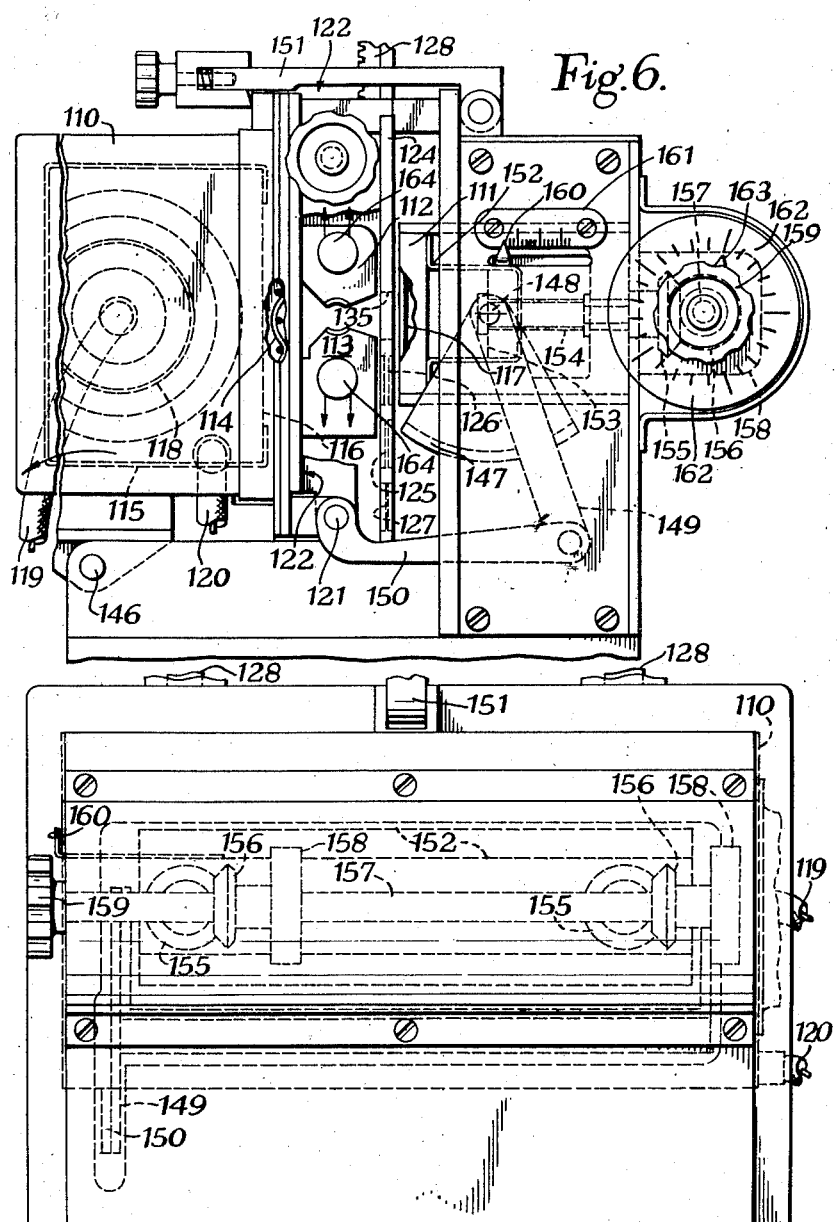

April 29, 1958   G. F. W. POWELL   2,832,352
MACHINES FOR MANIPULATING CUT TOBACCO
Filed Aug. 11, 1952   8 Sheets-Sheet 4
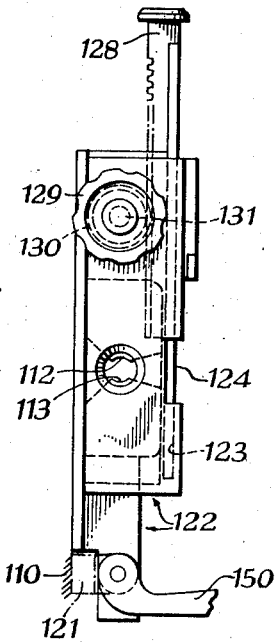
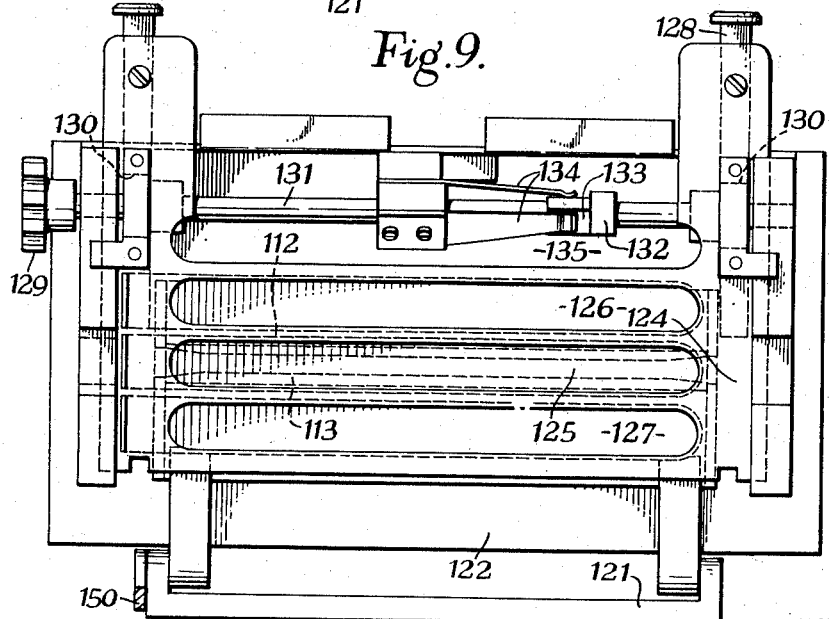
INVENTOR
Gordon F.W. Powell
BY Watson Cole
Grindle & Watson
ATTORNEYS April 29, 1958 G. F. W. POWELL 2,832,352
MACHINES FOR MANIPULATING CUT TOBACCO
Filed Aug. 11, 1952 8 Sheets-Sheet 5

April 29, 1958     G. F. W. POWELL     2,832,352
MACHINES FOR MANIPULATING CUT TOBACCO
Filed Aug. 11, 1952     8 Sheets-Sheet 6
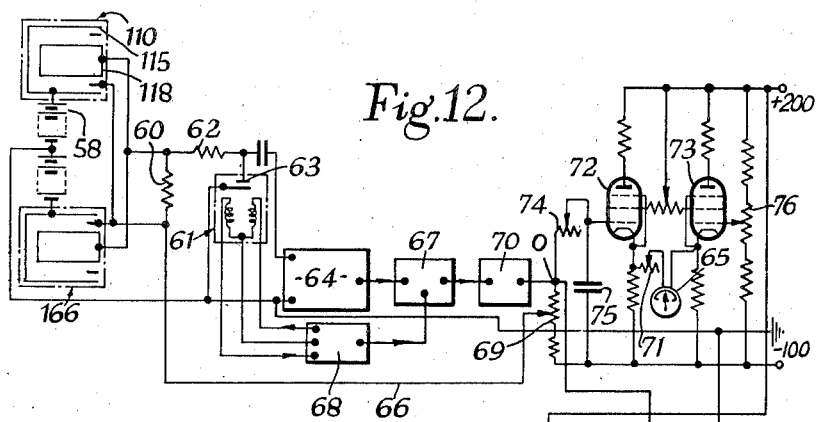
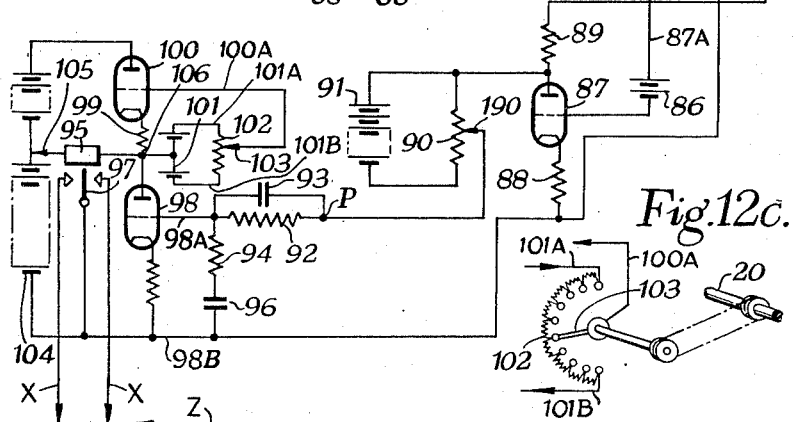
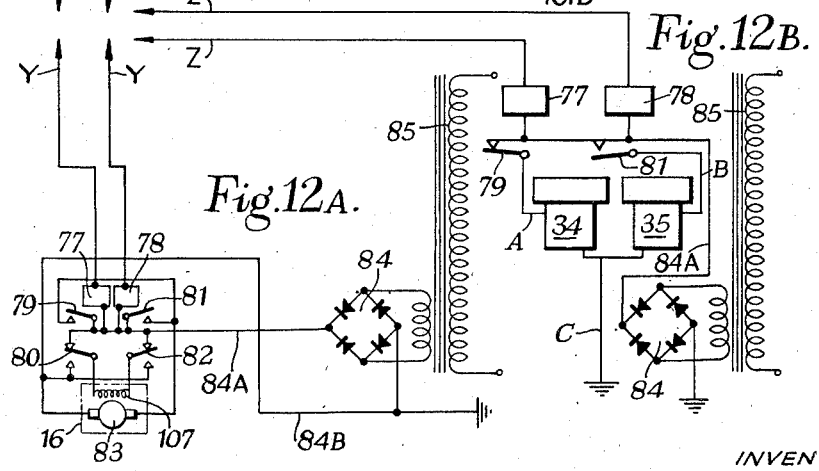
INVENTOR
Gordon F. W. Powell
BY: Watson Cole,
Grindle & Watson
ATTORNEYS

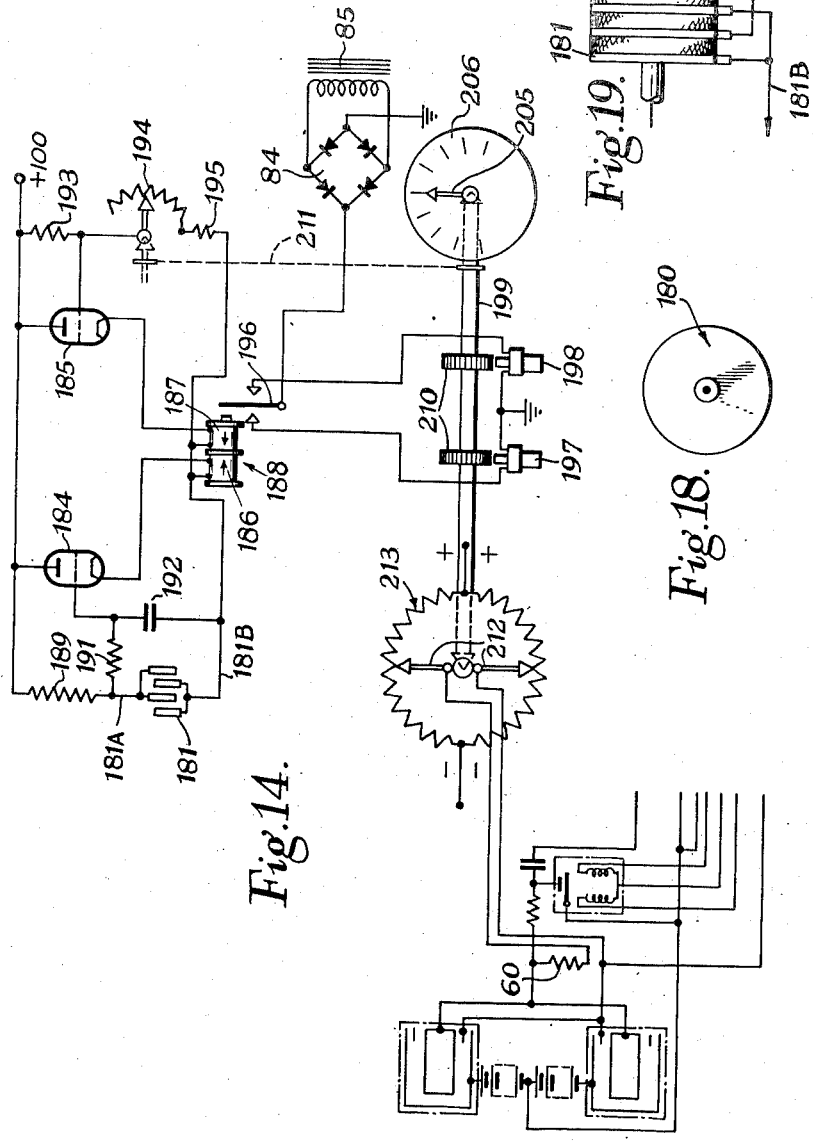

2,832,352

MACHINES FOR MANIPULATING CUT TOBACCO

Gordon Francis Wellington Powell, Deptford, London, England, assignor to Molins Machine Company Limited, London, England, a British company Application August 11, 1952, Serial No. 303,636

Claims priority, application Great Britain August 15, 1951

7 Claims. (Cl. 131—21)

This invention concerns improvements in or relating to machines for manipulating cut tobacco, for example, cigarette making machines. In tobacco manipulating machines cut tobacco is fed and subsequently issues from the machine in separated portions, that is, as cigarettes in a cigarette making machine or as packages in a tobacco packaging machine.

Cigarette making machines of the continuous rod type are provided with tobacco feeding apparatus in which a mass of cut tobacco is placed in a hopper and subjected to various brushing and combing operations and finally showered on to a conveyor where it forms a loose tobacco filler and by means of which, or a succeeding conveyor, it is formed into a tobacco rod, or core, which is afterwards wrapped in paper.

Owing to the nature of the mechanism used in the tobacco feeding apparatus, the quantity of tobacco showered varies according to several conditions, such for example, as the moisture contained in the tobacco, the temperature, the nature of the tobacco and the degree to which it is tangled when it is first placed in the hopper. In other words the showering rate is not constant and many attempts have been made to improve the uniformity of distribution of the tobacco in the resulting rod.

The most usual practice employed for checking the cigarettes produced has been to weigh them either singly or in batches at suitable intervals and the result of the weighing operations has been used, usually by automatic means, to alter the speed of the hopper by means of a variable speed gear which is employed on a continuous rod cigarette making machine so that the speed of the tobacco feeding apparatus can be altered without altering the speed of the cigarette making machine proper.

More recently various proposals have been made by means of which the tobacco content or density of tobacco in a stream is to be checked or maintained by electrical methods, usually by measuring the resistance thereof to high frequency currents or by determining the capacity of a quantity of tobacco passing through a condenser device. The result of the electrical measurement is to be used to alter the speed of the tobacco feeding apparatus through a system of relays and other electrical apparatus.

Such electrical methods however depend to a large extent on the moisture content of the tobacco, and require a very exact control of the moisture content if any practical result is to be obtained. For instance, if tobacco contains an average of 14% moisture, a variation of say ½% in the moisture would produce a very large difference in the detecting apparatus although the actual mass of tobacco may be the same. Thus this method of detecting and controlling the mass of tobacco creates difficulties in practice.

In United States Patent No. 2,704,079, in the names of Molins and Powell, granted Mar. 15, 1955, there is described and claimed a method of measuring the mass of tobacco occupying a given space by subjecting the tobacco to rays from a radioactive source of penetrative radiation, for example, beta rays, which are absorbed by the material in known proportion to its mass, and determining changes in the absorption with variations in the tobacco mass by an ionization chamber. The current resulting from a voltage applied to the electrodes of the chamber, when the gas therein is ionized, is, by suitable amplifying and other apparatus, caused to control a suitable electric motor and the movements of this motor are utilized to vary the speed of the tobacco hopper with respect to the speed of the rest of the machine. For this purpose the motor is arranged to move the regulating shaft of a variable speed gear which drives the tobacco hopper from the main shaft of the machine.

The apparatus described therein for carrying the method into effect comprises two ionization chambers, each with its co-operating source of rays, one chamber and ray source being arranged to test the tobacco mass and the other chamber and source being arranged to act as a standard, having a given material mass positioned between source and chamber. The standard is adjustable, by shifting the source towards or away from the chamber or by inserting a greater or lesser quantity of the said material mass.

The measurement is made on the cigarette rod in the specific example given in the earlier specification but in the present case arrangements are provided whereby the loose filler can be measured if desired.

In tobacco manipulating machines the desire is to improve the uniformity of the final product. This is, in cigarette making machines, a cigarette cut from the rod but the term final product is also to be regarded as referring to a finished rod prior to cutting, or to separated parcels of tobacco all of which items are, so far as the question of altering the quantity of tobacco or the distribution of the same, finished products.

According to the present invention there is provided in a machine for manipulating cut tobacco, a method of controlling the machine comprising measuring the mass of a length of moving tobacco filler by subjecting the length to rays from a radioactive source of penetrative radiation, for example, beta rays, the ionization powers of which are absorbed by the material in known proportion to its mass, and determining changes in the absorption with variations in the tobacco mass by an ionization chamber and applying the current due to the ionization to regulate, at some stage in the machine, the rate at which tobacco is being fed at that stage for the formation of the final product, the regulation being arranged to effect a combination of proportional control, rate of change control and integral control all as hereinafter defined. The arrangement may be such that the method is conducted in a closed loop system whereby the controlled output is continuously compared with the desired mass.

The measurement may be effected while the filler is supported on a tape, preferably flat or substantially flat, the ray source and ionization chamber being disposed one above the other, in either order, and the loaded tape between them.

In order that the regulation of the rate of tobacco feeding shall be most effective and precise it is necessary that the apparatus for controlling the speed of the tobacco feeder at the stage in question shall respond to the three aforementioned separate factors or aspects of the measuring operation, which are as follows:

(1) *Proportional control.*—The variation in speed (rate of feed) should be proportioned to the deviation of the mass being measured from the desired mass. The variation, although in direct proportion to the deviation, may include an amplifying factor or gain. This type of control is called "proportional control."

(2) *Rate of change control.*—The variation should also depend on the rate at which successive masses being measured are deviating from the desired mass, for it will be appreciated that if the performance of the machine is such that the measured mass is swinging sharply away from the desired mass, an urgent and vigorous alteration of the speed of the tobacco feeder is necessary, whereas, when the performance is such that the measured mass is only changing slowly from the desired mass a milder alteration of said speed is effective. This type of control is called "rate of change control" or "derivative control."

(3) *Integral control.*—The variation must be proportioned to the persistence of the deviation, that is, if the performance of the machine is such that the measured mass is persistently less (or greater) than the desired mass the speed alteration of the tobacco feeder should be such as to correct this persistent defect. This type of control is known as "integral control" since the change in the rate of feed effected is the result of taking notice of a succession of deviations or, roughly speaking, integrating them.

The invention will be more fully described with reference to the accompanying drawings which show its application to a continuous rod cigarette-making machine where, by way of example, the hopper speed is controlled to regulate the rate at which tobacco is fed by the hopper.

In the drawings:

Figure 1 is a diagrammatic front elevation of a continuous rod cigarette-making machine showing the application of the invention thereto.

Figure 1A is a fragment of Figure 1, showing a modification.

Figure 2 is a diagrammatic section of Figure 1 on the line 2—2 showing one possible location of a radiation device and ionization chamber.

Figure 3 is a diagrammatic section of Figure 1 on the line 3—3 but modified to show another location of a radiation device and ionization chamber.

Figure 4 is a sectional elevation of a device for altering a variable speed gear.

Figure 5 is a plan of Figure 4, partly in section.

Figure 6 is an end elevation showing the mounting of an ionization chamber and ray source and associated devices for manipulating the chamber and source, some parts being omitted.

Figure 7 is an elevation looking at the right-hand side of Figure 6.

Figure 8 shows parts omitted from Figure 6.

Figure 9 is an elevation looking at the right-hand side of Figure 8.

Figure 12 shows the electrical circuit for the control of an actuator which alters the speed of part of the machine.

Figure 12A is a continuation of Figure 12 showing the connections when a reversible motor is employed as the actuator.

Figure 12B is a continuation of Figure 12 showing the connections when a pair of solenoids constitute the actuator.

Figure 12C is a modification of a detail of Figure 12.

Figure 14 shows a circuit for use when the moisture content of the tobacco is to be considered in the measured mass of a finished product.

Figure 15 shows a detail omitted from Figure 1.

Figure 16 is a diagram of a modification to Figure 6.

Figures 18 and 19 are side and front elevations respectively of a roller used in Figure 17.

Figure 10:
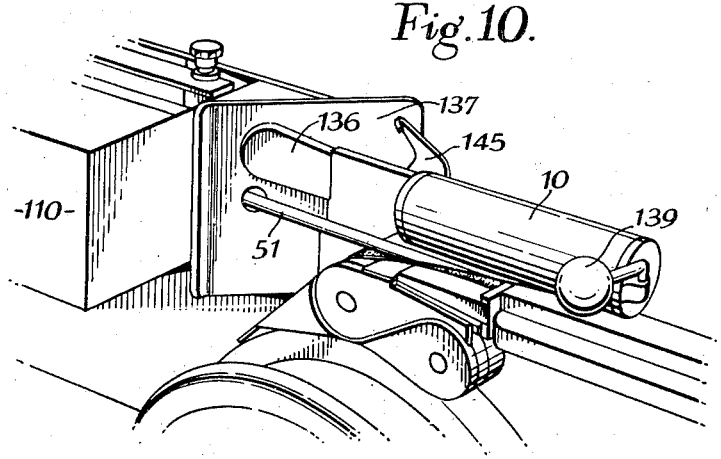
Figure 10 is a perspective view of part of the machine shown in Figure 1 looking substantially in the direction of the arrow marked III.

Referring first to Figure 1 the cigarette machine is provided with a tobacco feeding apparatus 1 which showers tobacco on a travelling endless belt 2. A paper web 3 is drawn from a reel 4 over the various rollers shown, passing through a printer or the like 5 and finally over a small roller 6 which leads it on to an endless tape 7.

The tobacco on the belt 2 is delivered on to the paper web 3 at the position occupied by the small roller 6 and the tape 7 carries the loaded web through folders and other devices, indicated by the reference 8, where the paper is wrapped around the tobacco core to form a continuous cigarette rod marked 51. The edges of the paper are secured together by paste from a paster 9 whereafter the rod passes beneath a heater 10 which dries the paste after which the rod is severed into separate cigarettes by a cutoff 11. These cigarettes pass on to an endless travelling tape conveyor 12, which carries them to a deflector device 13 where the deflector blades move the cigarettes out of the rod line and deliver them to a catcher band 14.

In order to vary the feed of tobacco to the belt 2 should the weights of the cigarettes produced deviate from the desired weight, there is provided a hopper driving shaft 15 whose speed is regulated by means such as a reversible electric motor or actuator 16 through gearing now to be described. Another kind of actuator will be described subsequently. The motor 16 which comprises a reduction gear at 17 has a sprocket wheel 18 on its shaft and this drives a further sprocket wheel 19 on a shaft 20. Movements of this shaft, which constitutes the speed regulating shaft for the hopper, vary the speed of shaft 15 and thus the feed of tobacco. On a shaft 21, which may be the main driving shaft of the cigarette machine, or one coupled to it, there is provided an expanding pulley device. This consists of a fixed cone 22 and a movable cone 23 slidable on a spline on the driving shaft. Between the cones are a number of curved segments 24 which can slide in grooves in the cones as the latter move towards and away from one another and are held to the cones by spring rings 25. The movable cone 23 is moved by a screwed bush 26 which runs on a fixed screw 27, the bush being rotated by a sprocket wheel 28 driven from the shaft 20 by a chain 29 and sprocket wheel 30. Suitable thrust rings are provided and as the bush rotates one way the cone 23 is moved in towards the other, or in the reverse direction, the pull of a belt 31 running on the expanding pulley opens the cones. A jockey pulley is provided to take up the slack in the belt and the latter passes over a large pulley 32 on the hopper driving shaft 15.

Instead of the motor 16, a form of actuator shown in detail in Figures 4 and 5 may be used. Its position is shown in Figure 1A by the general reference 33. Its construction will now be described with reference to Figures 4 and 5.

Referring to Figure 5 of the drawings, it will be seen that lines A, B and C lead from a pair of solenoids 34 and 35 and constitute connections to an electric supply.

The plunger 36 of each solenoid is connected to one arm 37 of a lever 38, the other arm of which constitutes a pawl 39. The levers 38 are further connected by bearings formed at the lever pivots 40 to a pivoted lever 41. The pivoted lever 41 is oscillated about its pivot 42 by a link 43 attached to an eccentric 44, see Figure 4, which is fixed at the end of a shaft 44A journaled in a bearing 44B and driven from the main drive of the cigarette making machine.

By means of this eccentric the pawls 39 are constantly vibrated in the neighbourhood of ratchet wheels 45 and when one of the solenoids 34 or 35 is energised, its plunger 36 is pulled downwardly against the action of a spring 46 and causes the corresponding pawl 39 to engage with a ratchet wheel 45. The wheels 45 are arranged so that one causes a shaft 47 to be rotated in one direction whilst the other causes the shaft to be rotated in the reverse direction. The shaft 47 is connected, as shown in Figure 1, by a sprocket wheel 48 and chain 49 to a sprocket wheel 50 on the control shaft 20 of the variable speed gear through which the tobacco feeding apparatus is driven from the main drive of the cigarette machine and when the shaft 47 is rotated in one direction or the other, the tobacco feeding apparatus operates at a faster speed or slower speed according to the direction in which the shaft is rotated.

The movements of the motor 16 or the actuator 33, as the case may be, to vary the speed of the tobacco feed are obtained from apparatus described later but first a short description of the basic ideas of the invention will be given.

The principle employed is based on the use of rays from a radioactive source, for example beta rays (or high speed electrons), and an ionization chamber. In one arrangement the filler or rod, the mass of which it is desired to measure, is arranged between the beta ray source and the ionization chamber. If the filler is being measured, as it must be supported on a tape, this may be of U-section or, if a flat tape is used, guides must be provided for the sides of the filler. In either case the mass of the side guiding devices is known and can be accounted for when the rays are arranged to pass through guides and tobacco.

Any extraneous material such as the tapes or guides referred to, which intercepts the rays is undesirable and in order to reduce this material to the minimum the ray source and chamber may be disposed above and below the tape. This enables a flat tape to be used so that only a single thickness thereof intercepts the rays and the bulk of the influence is available for tobacco detection. The tape could be a shallow concave curve on its upper surface, without material difference, so as to control the filler laterally without side guides and in all cases the arrangement is best in which the minimum amount and thickness of extraneous material is allowed to intercept the rays. In cases where side guides are necessary but the rays do not pass through the guides before and after passing through the tobacco, such guides should be thick enough to absorb all rays meeting them so that the rays passing to the chamber are only those which have passed through the tobacco. The source of the rays may be a radioactive material such as Thallium "204" or Strontium "90". The ionization chamber is in circuit across a source of D. C. voltage with a resistance of high value. The effect of the high speed electrons entering the chamber is to ionize the contained gas (air) and to cause a minute current to flow in the resistance. The value of this current is substantially proportional over the working range to the number and energy of the electrons entering the chamber and causing ionization and this number, and hence the current, depends on the absorption taking place in the cigarette and this depends on the mass of the filler being scanned by the source. The current in the chamber is too small for direct practical use and it is amplified to a sufficient degree to operate a direct indicating meter and a circuit to operate the motor or other actuator to correct the tobacco fed to form the cigarette rod so as to keep this of uniform weight.

The present method (subject to certain reservations explained later) does not suffer from any difficulties due to moisture content, because as is known, the absorption of beta rays depends, for a constant section, entirely on the mass of material through which the rays are trying to pass, and in the case of tobacco with a certain moisture content, if the moisture content be increased, the mass of the rod will be increased, and the ionization current will be decreased in proportion and an indication of the true weight will be obtained, which is as required.

Tobacco is of fibrous nature, unlike homogeneous material, and the packing of the fibres may vary a small amount along a formed rod or even a loose filler even though the true mass of the rod is substantially constant; because of this the measuring circuit is designed to have a time constant of 1 to 2 seconds so that the reading of weight obtained is the average over this period.

A length of filler or rod of about 6" is scanned and for this purpose an ionization chamber contained in a casing 110 is supported at one side of the filler or rod and a ray source contained in a box 111 at the other side. These devices are positioned beyond the hopper preferably as near as possible thereto to reduce the delay in correction to the minimum, but in Figure 1 the devices are shown at I.

Alternatively the devices could be positioned to scan the loose tobacco filler on the paper web 3 just to the left of the section line 3—3 and as shown in Figure 3. Or again, they could be located between the heater 10 and the cut-off 11 to scan the wrapped rod.

In Figure 2 the U-shaped tape 2 is guided by guides which are made thick for the purpose of absorbing any rays reaching them while in Figure 3 the tape 7 is flat and has the flat paper web on it. Thick side guides are also shown in this view but if the tape is slightly curved with a concave upper surface, as it actually is just beyond section 3—3, the side guides can be dispensed with, that is, as soon as the tape is curved enough to carry the filler without any spilling over the sides, other guides are not necessary.

In the position where the devices are used for checking the wrapped rod and in Figures 6 and 7, to which reference is now directed, they are provided with rod guides 112 and 113 which are so shaped that only the centre part of the rod is scanned, to avoid any errors which might occur if the whole rod were scanned as the rod is liable to move up and down slightly. By this arrangement there is as small a change as possible in the length of tobacco through which the rays pass.

The chamber casing 110 has a wire mesh guard 114 over its open side. Inside the casing is an inner casing 115 which constitutes the ionization chamber and has a thin metal window 116 through which the rays can pass. The chamber also functions as one electrode of the device. The box 111 is similarly provided with a window 117 through which rays can pass. Inside the ionization chamber 115 is an inner electrode 118. The chamber is hermetically sealed and contains air. Cables 119 and 120 connect the two electrodes to the electrical apparatus described later with reference to Figure 12.

A similar device is provided for use as a balancing device as explained later.

Referring now to Figures 6 to 8, at the lower edge of the chamber casing 110 where it faces the ray source in box 111 there is provided a hinge bracket 121 to which is pivotally attached a holder 122, hereafter called a screen holder. The hinge bracket is shown hanging down from its pivot for clearness in Figures 8 and 9, but its proper position with relation to the casing 110 is shown in broken lines in Figure 8. The screen holder has grooves 123, Figure 8, in it in which a screen frame 124, comprising three screens 125, 126 and 127 respectively, Figure 9, can slide. The screen holder is broken away in Figure 6 to show inner parts. Normally the screen holder lies against the face of the chamber casing 110, as in Figure 6, so that the screens are facing the ray source. The screen frame is slid up and down the grooves of the holder by means of rods 128 at each side of the frame which are provided with rack teeth, as shown in Figure 8, and engage pinions 130 on a small shaft 131 journalled across the screen holder 122 and provided with a knob 129 by which it can be rotated. On the shaft 131 there is fixed a cam or detent device consisting of a cylinder 132 on which three flats 133 have been worked, each flat being a chord of the original circular section. These flats co-operate with stiff flat springs 134, fixed to the holder 122 so that as the knob 129 is rotated and the frame is slid up and down by the pinions and racks, the cam 132—133 rotates and the engagement of the flat springs with the flats on the cam provides a detent which will hold the screen frame in a definite position when the knob 129 is released.

The screen frame comprises a series of apertures for example, three, the middle one of which has a thin metal covering or screen 125 which is equivalent in absorption to the desired tobacco mass while the apertures above and below the middle one are provided with a thicker screen 126 and a thinner one 127 respectively. The thickness chosen depends on circumstances and the requirements of users, but conveniently the upper one 126 offers the same resistance to the passage of rays as a tobacco rod 4% denser than normal would offer while the lower one 127 offers a resistance of 4% less than the normal rod. These screens may be made of duralumin. There is a fourth aperture 135 without a screen.

Figure 11:
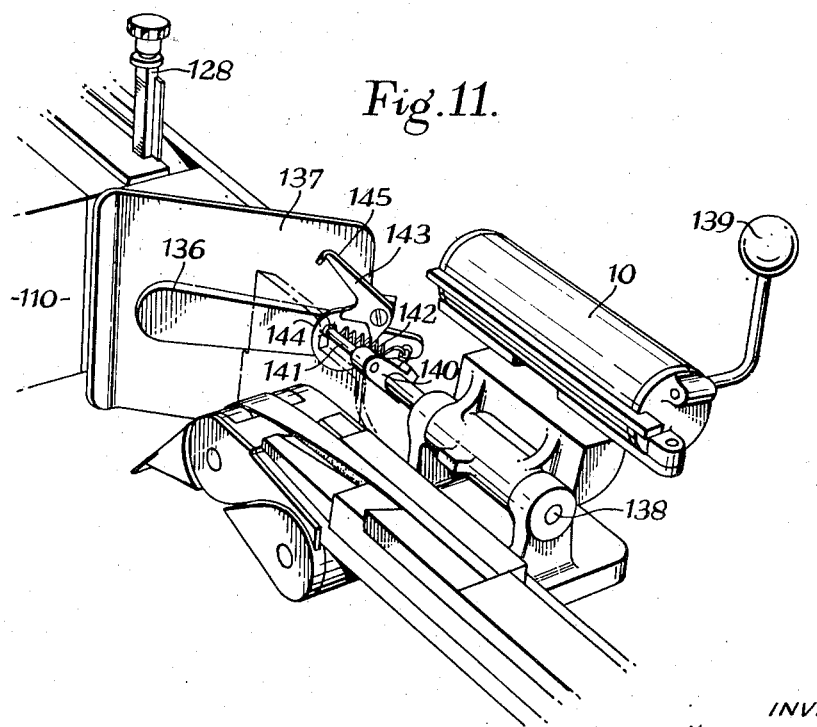
Figure 11 is a view similar to Figure 10 with some parts in a different position.

In use the apparatus is operated with the fourth aperture in line with the rod and, referring now to Figures 10 and 11, if it is desired to check the functioning of the whole control apparatus the cigarette rod 51 is deflected by manipulation by the operator in the known manner and the passage through the rod guides 112 and 113 is closed by a pivoted shutter 136 whereafter the moving rod is turned aside by an oblique guard plate 137. The screen frame is then moved to bring any desired screen into line with the ray source and a reading on a meter 65 (see Figure 12) is taken. Also, if a tape record is being made, the position of the pen on the web or the resultant curve may be noted. When the attendant is satisfied that the apparatus is functioning properly he lifts the shutter 136 to permit the rod to pass through in the ordinary manner and shifts the screen frame back to the fourth aperture position, so that aperture 135 is between the rod and the ray source.

When a machine is being started at the beginning of a run the heater 10 is lifted from the rod engaging position in the usual manner and this movement is utilised to move the shutter 136 automatically to close the passage through the guides 112 and 113 so that rubbish does not accumulate in the guides. For this purpose the pivot or rod 138 on which the heater 10 is supported is fixed to the operating handle 139 of the heater so as to rotate when the heater is swung up or down. At the end nearer to the beta ray device the pivot rod 138 is provided with a crank 140 at the end of which is a pin 141 to which a spring 142 is attached. The other end of the spring is attached to the pivoted shutter, at one side of the pivot. The upward movement of the heater relaxes the spring and the shutter will drop by gravity to the closed position, see Figure 11.

Assuming the machine is running and a test is desired, the operator breaks the rod and as the heater 10 is down and the spring 142 stretched, the shutter is pushed down manually and held closed by a small catch 143 which engages a notched plate 144 attached to the shutter 136. When the test is over the operator trips the catch by a handle 145 and the shutter swings up, under the tension of the spring 142, to expose the passage.

The chamber casing 110 is pivotally mounted at 146 so that it can be swung in the direction of the arrow, Figure 6, to bring its operative face horizontal and facing upwards, and the consequence of such a movement is that the beta ray source is emitting rays into the atmosphere and in a direction where they are likely to strike the operator. As a precaution against such an event there is provided an arcuate flap 147 which is pivoted to the ray source at 148 and operated so that in one position the source is exposed while in the other position the window of the source is closed by the flap. A lever 149 is attached to the arcuate flap and connected by a link 150 to the hinge 121 between chamber and holder in such manner that as the chamber casing is opened, the lever is swung and the flap 147 moves up to cover the window 117 of the ray source. When the chamber casing 110 is closed the flap is lowered. The chamber casing is held in the closed position by a clamp 151.

The movable screen holder, the shutter operated by the heater, and the arcuate flap form the subject of U. S. Patent No. 2,759,108, granted August 14, 1956, and no claim to these devices is made herein.

The ray source is adjustable towards and away from its ionization chamber and for this purpose, see Figures 6 and 7, the box 111 has fixed thereto a bracket 152 whose rear comprises a thick plate 153 which is threaded to receive two rotatable screws 154. These screws are fixed to bevel gear wheels 155 which are rotated by other bevel gear wheels 156 fixed on a shaft 157 journalled in bearings 158. A hand knob 159 is fixed to the shaft 157 and when the knob is rotated the box 111 is moved to and fro. A pointer 160 fixed to the bracket 152 travels over a scale 161 and subdivisions of the scale measurement are afforded by a dial 162 marked into suitable divisions, against which moves a pointer 163 fixed to the knob.

For reasons given later in the description of the operation of the apparatus it is technically desirable to use a second source and chamber jointly constituting a "balancing device," with a metal screen interposed which has a ray absorption equivalent to that of the desired tobacco mass and to arrange this chamber electrically in opposition to the first chamber so that any current resulting from the measurement is the difference between the currents in each chamber.

In order that the output or current from the apparatus shall be a measure of the tobacco mass only, it is necessary that in all conditions of measurement any extraneous factors affecting the measuring device shall be applied to the balancing device so that the resulting current depends solely on the tobacco mass.

For instance where measurement is made on the wrapped rod in order to prevent condensation in the measuring device due to the moisture from the freshly sealed seam it has been found necessary to provide heaters, shown at 164, Figure 6, which may be thermostatically controlled. In the case where measurement is made while loose tobacco is conveyed on a tape it will be appreciated that the rays pass through the tape. The absorption by the tape changes with use because the tape wears away, particularly at first, and the pores of the tape tend to become filled with dirt, particles of tobacco and possibly particles of the metal (steel) of the guides and other members which control the path and movement of the tape.

To meet these requirements identical heaters and controls therefor are provided in the measuring device and the balancing device, and where measurement is effected on a filler conveyed by a tape and the rays pass through the tape, see Figures 2 and 3, the balancing device consisting of ray chamber 165 and ionization chamber 166 is positioned to scan the tape at a place shown in Figure 1, where the tape does not carry tobacco.

The movable screen holder above described is used with the measuring device and an identical screen holder is provided for the balancing device. In other words, the measuring and balancing devices are identical in all respects save that the balancing device is so adjusted that in place of the tobacco passing through the measuring device a metal screen, the screen 125, Figure 9, whose ray absorption is equivalent to that of the desired tobacco mass, is used in the balancing device.

As a measure of economy in manufacture the measuring chamber need not have the ray position adjustment so long as the balancing chamber is adjustable.

Where a flat tape is scanned a scraping device may be employed on the return run of the tape 2 so that when it enters the balancing device at the position shown in Figure 1, the tape is clean and free from dust or other foreign bodies which would interfere with the accuracy of the balancing device. Alternatively and preferably the device may scrape the tape immediately after leaving the balancing chamber and before going through the hopper. The scraping device is shown in Figure 15 and consists merely of a box 200 containing scrapers 201 and an outlet 202 leading to an exhaust system. As a further safeguard against inaccuracy due to dust the measuring and balancing device may be provided with blowers 203, Figure 16, which blow a jet of air across the face of each ray box and remove any dust therefrom.

These features of the balancing device and its location relatively to a tape form the subject of the copending U. S. application, Serial No. 320,281, filed November 13, 1952, in the name of Desmond W. Molins, and no claim is made herein to them and they are described only as part of the best way of carrying out the present invention.

The operation of the apparatus will now be described with reference to Figures 12 to 12C during which description other parts will be referred to.

The window in the casing 110 is positioned opposite the radioactive source in the box 111 so that the rays that penetrate the filler pass into the chamber. A source of D. C. voltage, e. g. a battery 58 is applied between the ionization chamber 115 and part 118 which is an electrode, the chamber itself also constituting an electrode. The beta particles that enter the chamber 115 cause ionization of the gas (air) in the presence of the applied potential and the resultant current, which is a measure of the energy of the rays penetrating the tobacco, develops a voltage, across a high value resistance 60. This voltage must be amplified before it can be put to practical use, and because it is essentially a D. C. voltage, a form of D. C. amplifier is necessary. This amplified voltage provides a signal from which a further signal (to be described later and termed a modified signal) is derived.

It has been found most satisfactory to use a vibrating condenser electrometer 61 in which the input D. C. potential is first converted to A. C. by applying it through a resistance 62 to a condenser 63 the capacity of which changes at a suitable frequency (500 cycles). An A. C. voltage proportional to the D. C. input is developed across this condenser, which is passed into a conventional A. C. amplifier 64 and subsequently rectified to produce a D. C. voltage proportional to and in phase with the deviation from the desired weight.

The output voltage, in addition to energising a direct reading meter 65 operates a correcting circuit, hereinafter described.

The value of the resistance 60 referred to earlier across which the voltage is developed is of the order $10^{10}$ to $10^{11}$ ohms. It is found that resistances with a high value like this are rather unstable, that is, the voltage developed across the resistance changes slightly with time. Because of this it has been found desirable to use an additional radioactive source 165 and an ionization chamber 166, Figure 1, see also Figure 12, as explained previously, to form a balancing device, which, for the desired mass of filler or rod is arranged to pass a current equal and opposite to that from the chamber in the casing 110, measuring the filler or rod. The high resistance 60 then only conducts the difference in the two currents and, at balance, small fluctuations in the value of this resistance are unimportant.

From the A. C. amplifier 64 current passes to a phase-sensitive rectifier 67 which works in synchronism with a maintaining circuit 68 for the vibrating condenser; by this means the output voltage developed at a point O across a cathode follower load resistance 69 which receives current from a cathode follower 70, which point is normally at the same potential as the earth line, will change to a positive value or a negative value dependent on whether the output from the measuring chamber relative to that from the balancing chamber is greater or less; in addition provision is made for a controllable portion of this voltage to be fed back along line 66 to the input, that is, to the resistor 60, to stabilise the amplifier against internal variation and to allow adjustment of overall sensitivity.

The indicating meter 65 is connected in series with a variable resistance 71 (to adjust the sensitivity of the meter) between the cathodes of two tubes 72 and 73, the whole arrangement forming a balanced tube voltmeter. The circuits of these tubes are arranged by adjusting a resistance 76 so that with the point O at earth potential the two cathodes are at the same potential and there is no current in the centre-zero meter 65. The circuits of the phase-sensitive rectifier 67 and cathode follower 70 are also arranged so that when the output from the measuring chamber in casing 110 is the same as that from the balancing chamber 166 the point O is at earth potential.

As a result, when the meter 65 is in the zero position the mass of the filler is at the desired value and when this value varies, the indication on the meter will follow the change, a change of 5% in weight from the desired value of the filler or rod causing full scale deflection, when the variable resistance 71 of the meter is set for maximum sensitivity. This range of 5% is rather narrower than is required in practice and the apparatus can be adjusted up to a full scale deflection equal to 8% change in weight.

As previously mentioned tobacco is not a homogeneous material, and it has been found necessary to introduce an integrating circuit between the meter and the measuring circuit so that the indication will be in accordance with the average mass measured over a short period. This is accomplished by an integrating circuit formed by a resistance 74 and condenser 75. When the potential at the point O changes, the control grid of the tube 72 cannot follow immediately because of the large capacity of condenser 75 which must alter its charge, and the speed at which this takes place depends on the value of the resistance 74 which is adjustable.

As described previously means are provided for adjusting the feed rate of tobacco from the hopper to the conveyor on which the filler is formed. The motor 16 is a reversible motor. All the time that this motor is stationary the relative speeds of the shafts 15 and 21, Figure 1, will remain constant. When, however, the motor is moving in one direction the shaft 20 will alter the variable speed gear of Figure 1 to, say, increase the hopper speed, and when the rotation of the motor is reversed the speed of the shaft 15 will be decreased. Similarly if the actuator of Figures 4 and 5 is used instead of the motor the relative speeds of the two shafts will change.

Between the apparatus above described and the motor, or other actuator, switching devices, shortly to be described, is further apparatus for causing the operation to be in accordance with the rules given previously.

A line from the point O leads along a line 87A to a battery 86 which is connected to the grid of a triode 87, the cathode of which is earthed through a resistor 88 as usual. The anode is connected as usual to a voltage source through a resistor 89, and a further line from the anode leads to one end of a resistance 90 across which a battery or like 91 is connected. An adjustable tap 190 on the resistance 90 leads to a second resistance 92 shunted by a condenser 93. The adjustable tap 190 is set so that the output voltage at the junction of resistance 92 and condenser 93, that is, point P is zero relative to earth when the filler is of the desired mass. At the other end of the second resistance 92 is a line leading through a third resistance 94 in series with a large condenser 96 to earth. From the common point of said second and third resistances 92 and 94 a line 98A leads to the grid of a second triode 98 whose cathode is joined to earth along line 98B. The anode of this tube is connected through the anode terminal, marked 106, to one side of a sensitive polarised relay 95, and also to the cathode resistor 99 of a third triode 100 and also to the centre point of a battery 101. This battery is across a resistance 102 and a tapping 103 therefrom is connected to the grid of the tube 100. The other side of the relay 95 is connected to a tap 105 on a supply battery 104. This battery could be replaced by a potentiometer connected to the 200 volt supply.

When the machine is operating correctly, that is, when the error signal remains at zero for some time the grid of the second triode 98 is at zero potential. Under these conditions the voltage at the anode terminal 106 which would tend to drive a current one way through the relay is opposed and balanced by the voltage at the tap 105 of the supply battery. The relay 95 being sensitive has a small differential or backlash and so, for all practical purposes, the control is continuous, that is, it is only when the measurement signal is exactly in balance that no alteration in speed control takes place. The expression "continuous control" is therefore to be considered as including such a control. The relay tongue 97 therefore stays central until the measuring device registers a change in the mass of tobacco. Such a change upsets all the conditions of balance. The first triode 87 will have its grid voltage changed so that its output is no longer balanced by that from the battery 91 across the tapped part of the resistance 90. This causes a current to flow through the second resistance 92 and its shunted condenser 93 the third resistance 94 and the large condenser 96. Accordingly the voltage at the grid of the second tube 98 changes from zero to a positive or negative value. Conditions at the anode terminal 106 change and current flows one way or the other through the relay 95. The tongue 97 goes over and current flows, by switching devices described below, through the motor 16 or one of the solenoids 34, 35 and the motor or other actuator moves to shift the variable speed gear of the hopper in the required manner.

This movement is utilised to alter the position of the battery tap 103 of the third tube 100 so as to re-establish a balance under the new conditions whereupon the motor or other actuator ceases to shift the gear and the machine continues to run to the new setting or conditions of balance.

By the expression "continuous control," is, of course, meant that the control is continuously being operated at all times when the error or the composite signal derived from it requires any change. It will be appreciated that almost any correcting device will have some inertia and some time-lag and, therefore, the expression "continuous control" here means not necessarily that the control is continuously moving but that the device is attempting to make the control follow the signal.

In Figure 12 the tap 103 is shown without automatic adjustment because of the small scale but the actual arrangement used is shown in Figure 12C where a ten-step potentiometer constitutes the resistance and its contact spring is shifted by chain gearing to the shaft 20 of Figure 1. The line marked 100A leads to the grid of tube 100, Figure 12, where the line is similarly marked while lines 101A and 101B connect the potentiometer resistance to the battery 101, Figure 12, where these references are repeated.

A flow of current through the second and third resistances 92 and 94 respectively as just described causes a grid change in the second triode 98 due to the variation in measurement, i. e. proportional control.

Meanwhile the condenser 93 shunted across the second resistance 92 is charging at a rate proportional to the rate of change of the tobacco variation, so this causes an additional current to flow through the third resistance 94 and further modifies the grid voltage of the second triode 98.

Also, the large condenser 96 is, over fairly long periods, charged or discharged according to the variation in voltage at the point O and its state at any instant, which is due to the persistence of the error in the mass of tobacco, further modifies the grid voltage of tube 98.

Thus the combined effect is due to all three factors or aspects of the measuring operation.

To explain the matter in more detail, the relay tongue 97 moves whenever there is a change in the grid voltage of tube 98, the tube output being normally balanced by the output of tube 100, that is, when the grid of tube 98 is at its normal value because the filler is correct and unvarying.

The grid of tube 98 is fed from a point where the resistance 92 joins the resistance 94 and the feed to these resistances is from the tube 87. The grid voltage of tube 98 is the voltage between said point and the ground.

The following points should be noted:

(1) Resistances 92 and 94 in relation to capacity 96 are such that the time constant CR in seconds is long (for instance, of the order of 20 seconds), therefore, a voltage change of any reasonable magnitude only appears across 96 when an error signal has been maintained in one direction for some time.

(2) Resistance 92 is large in value compared with 94, therefore, neglecting the capacitors, the proportion of the output signal from tube 87 applied to grid 98 is small, but since tube 87 has considerable amplification the loss of error signal is recovered.

(3) Capacitor 93 in relation to capacitor 96 is small, but, as stated, resistor 92 is large compared with resistor 94, therefore, when a fast changing error occurs, the output from tube 87 is impressed on grid 98 in much larger proportion than the ratio, resistance 94/resistance 94 plus resistance 92, since the capacitor 93 prevents a sudden change of voltage across resistor 92. This additional control signal is approximately proportional to the rate of change of error signal.

On the occurrence of medium rates of change of error signal, the voltage change across capacitor 96 is small since this is time-dependent and "$t$" is small, similarly the proportion of voltage across 92 and 94 is substantially in the correct ratio since the change is not too fast for capacitor 93 to acquire the charge necessary for its voltage to rise, and let the voltage across capacitor 92 rise nearly to the correct amount. Under these conditions the signal applied to the grid of 98 is substantially proportional to the error signal at point "O," Figure 12.

When there occurs a much faster rate of change for a short period, capacitor 96 has no chance of acquiring any substantial voltage; likewise the voltage across capacitor 93 cannot rise sufficiently fast for the voltage across resistors 92 and 94 to bear their correct proportion of the output voltage from tube 87. Therefore, the voltage applied to the grid 98 is higher in proportion to the error signal than normal, and actually depends, with some approximation, to the rate of change of the error signal.

In the case of a slow rate of change of error signal, capacitor 93 plays no part since the capacitor 93 can acquire sufficient charge to allow the voltage across resistor 92 to be in its correct proportion and the control signal applied to grid 98 is the true proportion set by resistors 92 and 94 plus the voltage developed across capacitor 96 by the time integral. This latter (that is, the additional voltage from capacitor 96) is only strictly true if the error persists for a time well less than the true time constant, otherwise the rate of charge of capacitor 96 becomes logarithmic.

From the above it can be seen that the circuit does approximately give a modification of the error signal so that the response of the control device of the machine approximates to a proportional, rate of change, and integral of the error signal.

In effect the circuit elements just described form a simple stabilizing network; that is, the circuit allows a high loop gain to be used to reduce "offset" even though the machine has time lags which would cause the machine to oscillate violently with a large loop gain in the absence of the stabilizing network.

To explain the term "offset," let it be assumed that the overall system has a loop gain of 25. Let the machine be "set" so that the feed is delivering exactly the correct amount of tobacco to give the desired cigarette weight. Then, under these conditions, the measuring device detects no error and the feed control device is not called upon to alter the feed rate relatively to the machine speed.

Directly tobacco conditions alter, so that the feed delivers either too much or too little tobacco, an error signal appears and the controller alters the feed to reduce this error and to tend to maintain the cigarettes at the "set" point. However, to enable the controller to maintain the feed at its altered rate some error signal must persist. The magnitude of this error signal depends on the loop gain and represents the "off set," that is, the amount by which the cigarette weight is "off" the original setting. With the assumed loop gain of 25 and a change in tobacco conditions such that if the original feed rate had been maintained without alteration the tobacco actually delivered would be less by 1%, the change in the mean weight of the cigarettes with the control working being 1% divided by 1+25 (the loop gain), or 1/26%.

The "offset" then is a feature of the particular system used, where for practical reasons the loop gain is limited. If the circuit output contained a true integral of error component, the loop gain could become infinite and the "offset" insignificant.

From the actuator control circuit shown in Figure 12, two output lines marked X, X are shown with arrowheads, these leading from the contacts with which the relay tongue 97 engages, the tongue itself being earthed. Figure 12A shows the switching arrangements for the motor 16 where this is used as the actuator and in this case the lines X, X are joined to lines marked Y, Y. Figure 12B shows the arrangements where the solenoids are used and in that case the lines X, X are joined to lines marked Z, Z.

Referring first to Figure 12A the direction of rotation of the motor 16 is controlled by two magnetically operated switches 77 and 78 each having two contact arms 79, 80 and 81, 82 respectively.

The armature 83 of the control motor which constitutes the actuator in this case is supplied with direct current along a line 84A from a bridge-connected metal rectifier 84 with a return to the earth side of the rectifier along line 84B, the rectifier being fed by a winding on a transformer 85. Movements of the tongue of the relay complete a circuit from said rectifier to one or other of the magnetic switches mentioned above and such switch will in turn, through its associated contact arms, complete a circuit to the armature 83 and field 107 of the motor 16 and cause it to turn the regulating shaft and thereby change the hopper speed. The motor used is a reversible D. C. motor with epicyclic gearing incorporated. The gearing gives a final speed with ample torque on its output shaft.

Referring now to Figure 12B the magnetic switches 77 and 78 are again employed but each has only one contact arm and these are numbered 79 and 81. In this view three wires are marked A, B and C to correspond with those shown on Figure 5 and also on Figure 1A. Current is fed to the magnetic switches from a rectifier 84 along the line 84A in the same maner as in Figure 12A.

The amount of alteration made by the regulating shaft of the variable speed gear is in accordance with the instantaneous voltage developed across the resistance-capacity networks of the proportional, rate of change, and integral control system and the direction of rotation of the regulating shaft of the variable speed gear is always such that it tends to oppose any deviation from the desired weight.

When only a single ionization chamber is used the battery 58 is connected in series with the high value resistance 60. As in this case there is no balancing device the voltage across 60 can be offset by inserting in the feedback line 66 a battery with a variable potentiometer to produce a counter voltage equivalent to that developed across resistance 60 when the tobacco being measured is of the desired mass.

In order to secure accurate control of a machine it is necessary to ensure that the voltage at the lead to the resistance 92 with its shunted condenser 93, that is, at point P, should be an amplified reproduction of that at point O and, most particularly, when O is at earth potential, the point P must also be at earth potential, but with an amplifier 87 as described there is a tendency for a change in value or "drift" to occur. This may be offset by a suitable balancing device of the following nature.

Figure 13:
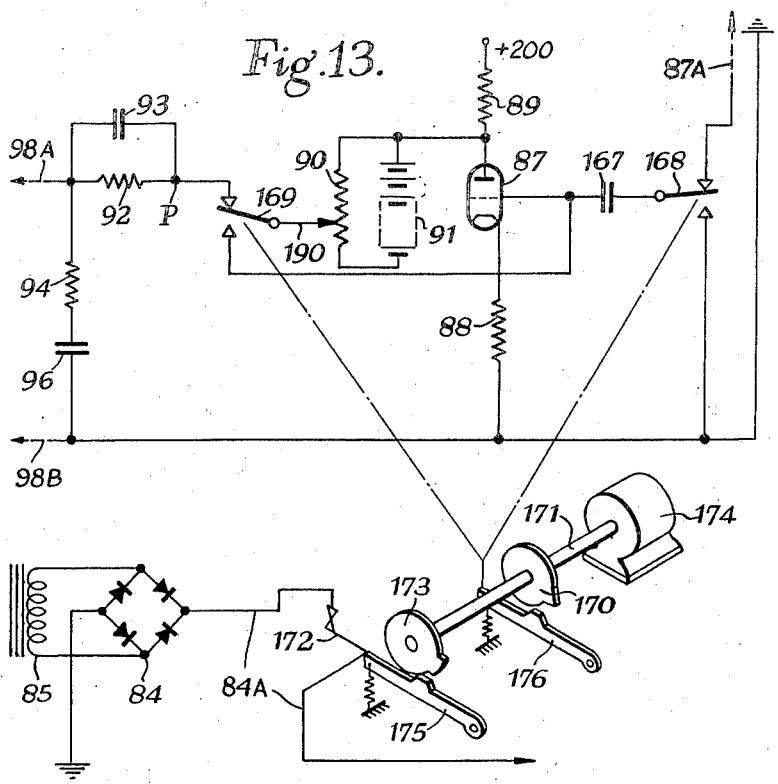
Figure 13 shows a modification to the circuit of Figure 12 to secure more accurate control of a machine.
Figure 17:
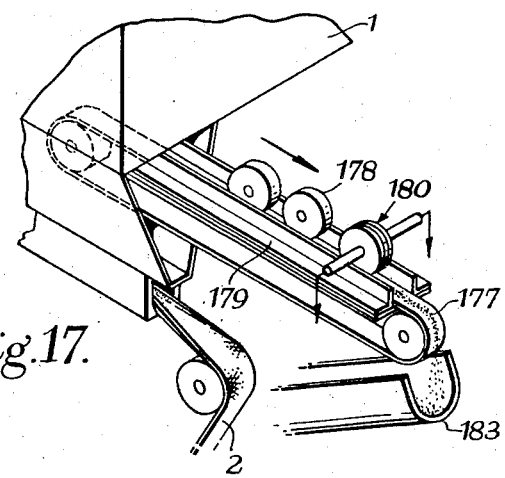
Figure 17 shows mechanical devices required when the circuit of Figure 14 is employed.

Referring now to Figure 13 which shows the necessary alterations to the circuit shown in Figure 12, the circuit functions exactly as before and is of the same general nature except that in the line 87A leading from point O toward the grid of the triode 87, which tube forms the main amplifying stage, there are interposed a changeover switch 168 and condenser 167, while the small battery 86 previously referred to when describing Figure 12 is omitted. The changeover switch 168, and another marked 169, are operated by a cam 170 mounted on a shaft 171, and a make and break switch 172, operated by another cam 173 on shaft 171 is provided.

The condenser 167 is preceded by the switch 168 having contacts on the lines leading to the condenser 167 and the earth line respectively, and contacting with one or other at predetermined times. The line leading from the adjustable tap 190 to the second resistance 92 is interrupted by the switch arm 169 which has two contacts, one on the line to the resistance 92, and the other leading back to the grid of the triode 87. The common point of resistances 92 and 94 is connected as in the case of Figure 12 by the line 98A to the grid of the tube 98 and the cathode of said tube is connected to earth along line 98B. The contacts 172, when operated, open the circuit from the rectifier 84 to the correcting mechanism, that is, the actuator. The shaft 171 on which are fixed the cams 170 and 173 is driven by a small unit 174 comprising a small synchronous electric clock motor and reduction gearing arranged to operate the cam levers 175 and 176 for a short period every 5 seconds, the lever 175 being operated just before and for just a little longer than lever 176. The precise repetition time is unimportant.

At all times when the mass of the filler is as desired, the point O is at earth potential and the lead to the second resistance 92, that is point P, should also be at earth potential and tap 190 is initially adjusted to give this, but due to the direct coupling between points O and P through the amplifier 87 any changes taking place in the characteristics of the amplifying valve 87 or its associated components including the supply batteries, upset this condition and tend to interfere with the controlled condition of mass of the filler. When this happens this amplifier is said to "drift," where the "drift" may be defined, as the voltage which should be applied at the grid of valve 87 when point O is at earth potential to restore point P to earth potential.

When the switch arms 168 and 169 are changed over to the opposite position from that shown, the output and input of the amplifier 87 are both joined together and connected to one side of condenser 167, the other side being connected to earth. With these connections, as the gain of the amplifier 87 is substantial, practically all the "drift" that has taken place in the amplifier circuit is impressed on the condenser 167 and when the switch arms 168 and 169 revert to their former position this condenser voltage is added in series with the input voltage from point O in correct phase to balance the output drift and restore the point P substantially to earth potential at all times that the input from terminal O is at earth potential.

The period during which the condenser 167 is connected to the output and input is short, for this period has only to be long enough for the condenser to charge to the drift voltage. To make this possible in this short time the output resistance of the amplifier 87 is made low compared with the capacity of condenser 167. In spite of this, when the condenser is in series with the input to amplifier 87 no appreciable change will take place across the condenser between the switching periods because the tube 87 is specially chosen and selected for low grid currents.

Because the switching period is short and the periods are infrequent the effect on the control circuit is negligible. The contacts 172 are opened just before and until just after the switching of arms 168 and 169 has been completed, as a safety precaution.

It has been previously remarked that the present method does not suffer from difficulties due to moisture content but it may nevertheless be desirable to incorporate modifications to take moisture into consideration, as the users will, as a rule, desire that the final product shall weigh a certain amount at a given percentage moisture content which may not be that at which the tobacco has been manipulated. The invention may therefore include a device for measuring the moisture content of the tobacco being worked and recording it and regulating the above described apparatus accordingly. Any suitable known device may be used to determine moisture content, for example, by measuring the resistance of a predetermined mass of tobacco positioned between electrodes from which suitable regulation may be injected into the circuit of the apparatus at a suitable position.

Suitable apparatus for this purpose will now be described with reference to Figures 14, and 17 to 19. A continuous flow of tobacco is extracted from the hopper in a narrow stream say ½" wide. This is taken out after initial operations have been performed on the tobacco and near to the main carded drum. The arrangement is shown diagrammatically in Figure 17 where the lower right-hand corner of the hopper 1 of Figure 1 is shown. A few inches of the shower which would otherwise fall on the tape 2 are intercepted by an upper tape 177 travelling in the direction of the arrow. The tobacco is formed into a lightly packed cheese of predetermined section and substantially constant mass, for example, by rollers 178 while being conveyed along on top of the upper tape, which is supported on and between insulated guides 179, and then passes under a roller 180, sprung downwards, as indicated by the two arrows, with constant heavy pressure. This roller, see Figures 18 and 19, is an assembly of thin metal discs 181 each 1/16" wide with insulated spacers 182 about 1/8" wide the metal discs being arranged to form electrodes between which the conductance of the tobacco is measured. The connections to the discs 181 are taken through the shaft of the roller, one at each end. With the construction shown the electrodes form three parallel paths for the measurement.

Referring now also to Figure 14 the electrodes are arranged in a bridge circuit and the conductance is continuously compared with a previously predetermined value and any deviation from this value causes a mechanism to inject a voltage of correct polarity and magnitude into the measuring circuit of Figure 12 to compensate. The tobacco that has been used for this measurement is showered back into the hopper in any suitable way to mix with the main feed and is very shortly afterwards delivered onto the tape to form part of the filler. As shown, the tobacco used for moisture determination drops into a chute 183 leading to the shorts conveying devices (not shown) which are generally fitted on such a machine and are conveyed thereby back on to the tobacco mass in the hopper. In Figure 14, two triodes 184 and 185 are provided, each connected as a cathode follower and having equal cathode loads 186 and 187 comprising differentially wound halves of a polarised relay 188. In the grid circuit of tube 184 a resistance 189 is connected in series with the electrodes 181 of wheel 180 across the voltage supply by means of leads 181A and 181B. From the junction of resistor 189 and discs 181 a resistance 191 leads to a condenser 192 and to the grid of tube 184. It will be appreciated that the voltage at the junction of 189 and 181 will vary in accordance with the conductance across the electrodes but it will also tend to fluctuate due to uneven packing of the tobacco passing under the electrode roller. The resistance 191 and condenser 192 form a time constant for smoothing this fluctuation and hence the voltage at the grid of 184 varies only because of the change in conductance caused by a change in the moisture content of the tobacco.

The triode 185 has resistances 193, 194 and 195 in series across the voltage supply and the junction of 193 and 194 is connected to the grid of the tube 185. Resistances 189 and 193 are equal in value, while resistance 194 which is adjustable is made variable to cover a range equal to the reciprocal of the highest and lowest conductances of the tobacco, with extremes of moisture passing under the electrodes.

The polarised relay 188 operates a contact tongue 196 centre biased between contacts connected to solenoids 197 and 198 of ratchet operating mechanism similar to that previously described with reference to Figures 4 and 5. The control shaft 199 of this mechanism has ratchet wheels 210 thereon and is coupled to the variable resistance 194 by a chain 211 and to two insulated contact arms 212 of a double potentiometer 213 to be described later.

When the arm of the resistance 194 is positioned so that the grids of tubes 184 and 185 are at the same potential the currents through coils 186 and 187 are equal and they neutralise the attraction on the relay tongue 196 and the circuit to both solenoids 197 and 198 is open. When however the moisture content changes, the voltage at the grid of tube 184 no longer remains the same as at the grid of tube 185 and the relay tongue 196 moves across, energising solenoids 197 or 198 as the case may be, and causing the ratchet mechanism to turn the shaft 199 in the appropriate direction which movement alters the value of resistance 194 until the balance is again restored.

The mechanism and circuit so far described results in the shaft 199 taking up a previously determined position for every value of moisture content, and this angular movement of the shaft is used to position a pointer 205 on a scale 206 so that the value can be observed, and to move the two insulated arms 212 over the double potentiometer 213.

It is found in practice that the variation of the conductance with moisture across the electrodes 181 above and below the standard value is not linear and in order that the rotation of shaft 199 with variation in moisture shall be linear, resistance 194 is wound with a specially graded winding. The arms 212 and the potentiometer windings of 213 are arranged and connected, and the arms are positioned on shaft 199 so that at the "standard" moisture content each arm is in the centre of a potentiometer winding and no voltage difference exists. Following rotation in a clockwise direction due to an increase in moisture content a positive potential exists between the upper and lower arms, while should the moisture become less than the standard value the shaft 199 rotates the other way and a negative potential then exists between the upper and lower arms. This voltage developed between these arms is inserted in series with the resistor 60 (Figure 12) at the lower end and this voltage modifies the input to the vibrating reed electrometer 61 and control elements so that if for example the moisture content is greater than standard when the output meter 65 reads correct weight, and the machine settles down, the actual weight produced will be sufficiently heavier to allow for subsequent conditioning the excess moisture and vice versa.

The position chosen for the detection of the moisture content is such that rapid changes are not met as the tobacco is well mixed and teased before it reaches the detector; an alternative position for the detector wheel is at the point that the tobacco emerges from the hopper, that is, near reference I, Figure 1, or it may be positioned earlier, in which case the variation may be impressed by suitable means on a continuously rotating endless magnetic tape so that the voltage injected in series with resistance 60 is delayed until that tobacco reaches the main measuring chamber.

While in general the invention is intended to be applied to a filler which is more or less of a narrow stream of tobacco particles, it can of course be applied to a stream of any size, that is, to measure any quantity of tobacco drawn from a supply hopper and manipulated to provide a substantially regular flow of particles. For example, where the device is applied for measuring the density of a fleece or carpet of tobacco it may be arranged to measure the carpet step by step. That is, a strip of carpet of suitable length, as measured in the direction of movement of the carpet, will be scanned and any necessary adjustments of the machine will be carried out in response to said scanning. Then a succeeding strip will be measured. A suitable timed switch may be incorporated in the apparatus for this purpose.

I claim:

1. In a method of controlling a machine for feeding cut tobacco to form a moving tobacco filler, the steps which comprise measuring the mass of an appreciable length of filler, generating an electrical signal of a magnitude varying with variation of the mass of the measured length of tobacco filler from a predetermined desired value, deriving from the said signal a composite signal varying with (a) said first named signal, (b) a differential of said first named signal, and (c) an integral over a substantial period of time of said first named signal, and controlling the feed of tobacco to form said moving tobacco filler in accordance with variation in said composite signal.

2. In a method of controlling a machine for feeding cut tobacco to form a moving tobacco filler, the steps which comprise subjecting an appreciable length of the filler to penetrative radiation of a type absorbed by the material in proportion to its mass, generating an electrical signal of a magnitude varying with deviation of absorption from a predetermined value, deriving from the said signal a composite signal varying with (a) said first named signal, (b) a differential of said first named signal and (c) an integral over a substantial period of time of said first named signal, and controlling the feed of tobacco to form said moving tobacco filler in accordance with variation in said composite signal.

3. In a machine for feeding cut tobacco to form a moving tobacco filler, the combination with a measuring device for generating an electrical signal of a magnitude varying with variation of the mass of a measured length of tobacco filler from a predetermined desired value, an electrical circuit including differentiating and integrating devices, means for applying said first signal to said circuit to obtain a second signal having a magnitude representative of the differential of said first signal and a third signal having a magnitude representing an integral over a substantial period of time of said first signal, means combining the three signals to provide a composite signal representative of (a) the deviation of the measured mass from the desired value, (b) the rate of progressive deviation from the desired value, and (c) the persistence over a substantial period of deviation from the desired value, variable feed mechanism for feeding cut tobacco to form the filler being measured, and devices for applying to said mechanism the composite signal to vary the rate of feed of the cut tobacco.

4. Apparatus as claimed in claim 3 and including devices responsive to moisture in the tobacco for generating a fourth signal, and means applying said fourth signal to modify the magnitude of said first signal to effect compensation for moisture variation.

5. In a machine for feeding cut tobacco to form a moving tobacco filler, the combination with a measuring device for generating a first electrical signal of a magnitude varying with variation of the mass of a measured length of tobacco filler from a predetermined desired value, said measuring device comprising a source of penetrative radiation, an ionization chamber, and means causing said filler to move between said source and said chamber, an electrical circuit including differentiating and integrating devices, means for applying said first signal to said circuit to obtain a second signal having a magnitude representative of the differential of said first signal and a third signal having a magnitude representing an integral over a substantial period of time of said first signal, variable feed mechanism for feeding cut tobacco to form the filler being measured, and devices for applying said signals to said mechanism to vary the rate of feed of cut tobacco.

6. In a machine for feeding cut tobacco to form a moving tobacco filler, the combination of a measuring device comprising a radioactive source of penetrative radiation and means responsive thereto for generating an electrical signal of a magnitude varying with variation of the mass of a measured length of tobacco filler from a desired value and a device responsive to moisture in the tobacco for generating a further signal and means applying said further signal to modify the magnitude of the first said signal to effect compensation for moisture variation if the moisture content of the tobacco changes and thereby to provide an output voltage representative of variation in uniformity of mass of the tobacco filler.

7. In a machine for feeding cut tobacco to form a moving tobacco filler, a tobacco feeder from which the filler is supplied, devices for controlling the tobacco feeder to vary the supply of filler comprising the combination of a measuring device for generating an electrical signal of a magnitude varying with variation of the mass of a measured length of tobacco filler from a predetermined desired value and devices responsive to moisture in the tobacco for generating a second signal, and means applying said second signal to modify the magnitude of said first signal to effect compensation for moisture variation if the moisture content changes, an electrical circuit including differentiating and integrating devices, means for applying said first signal, as modified by said second signal, to said circuit to obtain a third signal having a magnitude representative of the differential of said first signal, and a fourth signal having a magnitude representing an integral over a substantial period of time of said first signal, means combining the modified first, and the third and fourth signals to provide a composite signal representative of (a) the deviation of the measured mass from the desired value, (b) the rate or progressive deviation from the desired value, and (c) the persistence over a substantial period of deviation from the desired value, and means for applying said composite signal to said tobacco feeder to control the supply of tobacco to the filler.

References Cited in the file of this patent

UNITED STATES PATENTS

| | | |
|---|---|---|
| 1,708,074 | Allen | Apr. 9, 1929 |
| 1,878,109 | Clark | Sept. 20, 1932 |
| 2,264,725 | Shoupp et al. | Dec. 2, 1941 |
| 2,340,914 | Whitaker | Feb. 8, 1944 |
| 2,357,860 | Whitaker | Sept. 12, 1944 |
| 2,519,089 | Whitaker | Aug. 15, 1950 |
| 2,644,124 | Broadbent et al. | June 30, 1953 |
| 2,679,022 | McIlhenny | May 18, 1954 |
| 2,729,213 | Broekhuysen et al. | Jan. 3, 1956 |